US012634100B2

(12) United States Patent
Kessler et al.

(10) Patent No.: US 12,634,100 B2
(45) Date of Patent: May 19, 2026

(54) SYNCHRONOUS, FULL DUPLEX DAISY-CHAINED COMMUNICATION SYSTEM

(71) Applicant: Analog Devices, Inc., Wilmington, MA (US)

(72) Inventors: Martin Kessler, Salem, MA (US); Lewis F. Lahr, Dover, MA (US); William Hooper, Newton, MA (US); Matthew Puzey, Norwood, MA (US)

(73) Assignee: Analog Devices, Inc., Wilmington, MA (US)

( * ) Notice: Subject to any disclaimer, the term of this patent is extended or adjusted under 35 U.S.C. 154(b) by 303 days.

(21) Appl. No.: 18/464,512

(22) Filed: Sep. 11, 2023

(65) Prior Publication Data

US 2025/0088340 A1     Mar. 13, 2025

(51) Int. Cl.
H04L 5/14          (2006.01)
H04L 7/00          (2006.01)
(52) U.S. Cl.
CPC .............. H04L 5/14 (2013.01); H04L 7/0033 (2013.01)
(58) Field of Classification Search
CPC .... H04L 5/14; H04L 12/40013; H04L 7/0033
See application file for complete search history.

(56) References Cited

U.S. PATENT DOCUMENTS

| | | | | | |
|---|---|---|---|---|---|
| 6,549,917 | B1 * | 4/2003 | Pollard | ................. | H04L 67/306 |
| 7,035,323 | B1 * | 4/2006 | Arato | ..................... | H04L 25/14 |
| | | | | | 375/222 |
| 7,904,262 | B2 * | 3/2011 | Lancaster | .............. | G01R 22/10 |
| | | | | | 702/62 |
| 9,998,434 | B2 * | 6/2018 | Verzun | ...................... | H04L 9/34 |
| 11,323,285 | B1 * | 5/2022 | Bryant | ................... | G01V 1/306 |
| 12,028,824 | B2 * | 7/2024 | Chowdhury | .............. | H03L 7/18 |
| 2006/0245454 | A1 | 11/2006 | Balasubramanian et al. | | |
| 2009/0019129 | A1 | 1/2009 | Suzuki | | |

(Continued)

FOREIGN PATENT DOCUMENTS

| | | |
|---|---|---|
| CN | 105119794 A | 12/2015 |
| EP | 3764640 A1 | 1/2021 |

OTHER PUBLICATIONS

International Search Report and Written Opinion received for PCT Patent Application No. PCT/US2024/038755, Mailed on Oct. 22, 2024, 12 Pages.

*Primary Examiner* — Bailor C Hsu
(74) *Attorney, Agent, or Firm* — ArentFox Schiff LLP

(57)          ABSTRACT

A communication system includes a plurality of nodes connected in a daisy-chain via respective bus links, wherein the plurality of nodes are configured for full duplex, synchronized communication via a carrier-based modulation scheme over the bus links. A node is configured to: transmit a downstream synchronization control header (DnSCH) to a downstream node; receive an upstream synchronization response header (UpSRH) from the downstream node; measure a delay between the DnSCH and the UpSRH; send delay information to the downstream node in a DnSCH; receive a time adjusted UpSRH; and communicate with the downstream node and any upstream node over frames based on the delay information. The frames may include a header; a flexible payload defined by a stream mapping that assigns a byte location within the flexible payload to a stream; and a footer.

35 Claims, 9 Drawing Sheets

(56)        References Cited

U.S. PATENT DOCUMENTS

| | | | | |
|---|---|---|---|---|
| 2011/0044217 A1* | 2/2011 | Wu | ........................... | H04L 5/14 |
| | | | | 370/294 |
| 2012/0294229 A1* | 11/2012 | Saito | ................... | H04W 72/541 |
| | | | | 370/315 |
| 2015/0339730 A1* | 11/2015 | Endo | .................. | G06Q 30/0275 |
| | | | | 705/14.71 |
| 2018/0046171 A1 | 2/2018 | Sapir et al. | | |

* cited by examiner

SYNCHRONOUS, FULL DUPLEX DAISY-CHAINED COMMUNICATION SYSTEM

TECHNICAL FIELD

This disclosure is related to wired communication systems, and more particularly to synchronous, full duplex daisy-chained communication systems.

INTRODUCTION

Audio communication within vehicles has moved from analog signals (with one or two analog wires per signal) to digital communications (with multiple audio streams on a single wire or wire-pair). Example digital audio communication technologies may use a one-directional ring topology. Other technologies, e.g., Ethernet use a point-to-point technology that requires an Ethernet switch between each link as well costly audio clock regeneration at each node.

A2B is a true daisy-chained network with low latency because it does not require store-and-forward between nodes. A2B uses line coding and is time division multiplexed. Although A2B is the most established low latency audio communication in the car today, improvements in bandwidth may be useful to support future applications.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In some aspects, the techniques described herein relate to a node connected in a daisy-chain over full duplex links to one or more other nodes, the node configured to: transmit a downstream synchronization control header (DnSCH) to a downstream node; receive an upstream synchronization response header (UpSRH); measure a delay between the DnSCH and the UpSRH; send delay information to the downstream node in a DnSCH; receive a time adjusted UpSRH; and communicate with the downstream node and any upstream node over frames based on the delay information.

In some aspects, the techniques described herein relate to a method of operating a node connected in a daisy-chain over full duplex links to one or more other nodes, including: transmitting a downstream synchronization control header (DnSCH) to a downstream node; receiving an upstream synchronization response header (UpSRH); measuring a delay between the DnSCH and the UpSRH; sending delay information to the downstream node in a DnSCH; receiving a time adjusted UpSRH; and communicating with the downstream node and any upstream node over frames based on the delay information.

In some aspects, the techniques described herein relate to a communication system including: a plurality of nodes connected in a daisy-chain via respective buses, wherein the plurality of nodes are configured for full duplex, synchronized communication via a carrier-based modulation scheme over the buses, wherein to synchronize the nodes a main node transmits a downstream synchronization header in a downstream direction at a start of a superframe and each sub node in the plurality of nodes transmits an uplink synchronization header with a timing that is adjusted based on a delay in receiving the downstream synchronization header and a delay for the upstream synchronization header to reach the first node by an end of the superframe.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

To provide a more complete understanding of the present disclosure and features and advantages thereof, reference may be made to the following description, taken in conjunction with the accompanying figures, wherein like reference numerals represent like parts, in which.

DETAILED DESCRIPTION

Current daisy-chain communication systems provide for discovery of nodes in the chain. Typically, the daisy-chain follows a fixed frame schedule. One issue with having a flexible number of nodes and unknown cable lengths in a daisy-chain relates to timing with respect to the frame schedule. For example, A2B discovery does not automatically adjust response times and does not automatically phase align the nodes.

In an aspect, the present disclosure describes a daisy-chain communication system that uses completely new framing optimized for bi-directional, synchronous communication. The daisy-chain communication system supports a flexible payload (not fixed slots as in A2B) that can carry synchronous and asynchronous communication.

Instead of a line coding scheme, the daisy-chain communication system uses a carrier-based modulation (e.g., quadrature phase shift keying (QPSK)) and full duplex communication (instead of half-duplex ping-pong communication scheme within an audio sample period in A2B) to achieve 4 times more bandwidth and better electromagnetic compatibility (EMC). A novel mechanism is used that automatically aligns the audio-sample phase in all nodes. During discovery of a downstream node, the response time of a downstream node is measured by the upstream node. This measurement or the resulting adjustment is communicated back to the downstream node. From then on, the downstream node responds with time-adjusted (delayed) upstream messages. The adjustment is such that all nodes sample audio at the same phase and that a maximized number of daisy-chained nodes can all communicate within the same fixed time window. The unique framing of data is optimized for full duplex communication that can carry clock-synchronous data streams (e.g. digital audio) and also asynchronous communication and interrupt signaling.

Figure 1:
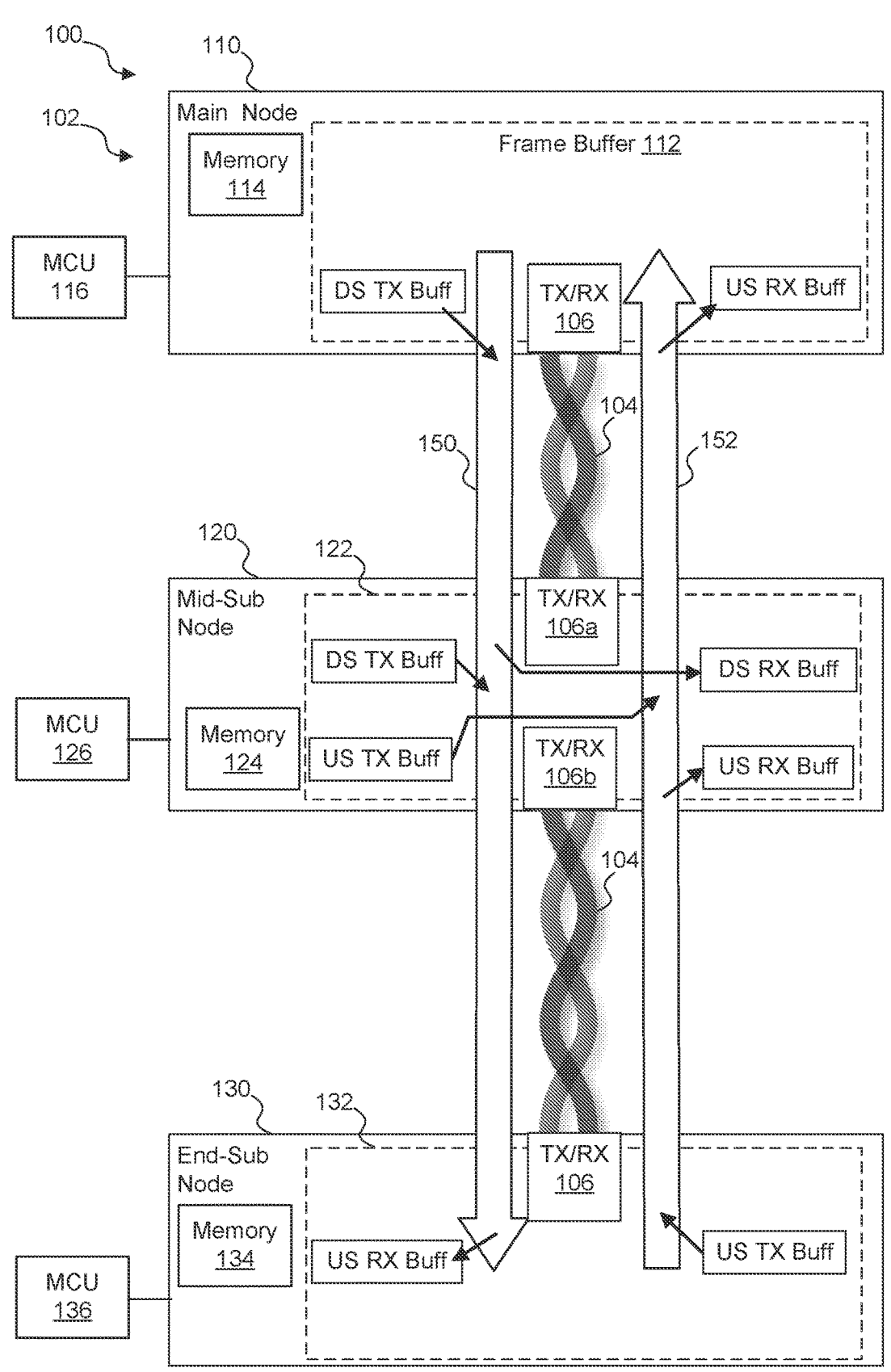
FIG. 1 is a diagram of nodes in a daisy-chain, according to an aspect of the disclosure.

FIG. 1 is a diagram 100 of nodes in a daisy-chain 102. In the daisy-chain 102, each node is connected to a subsequent node via a bus link 104. For example, the bus link 104 may be a twisted pair. As illustrated, the daisy-chain 102 includes a main node 110, one or more mid-sub nodes 120, and an end-sub node 130. In some implementations, each node is a device including one or more modems.

Each node 110, 120, 130 includes a corresponding frame buffer 112, 122, 132. The frame buffers 112, 122, 132 are configured to store information for one or more frames for transmission via the bus links 104 in a downstream direction (from main node 110 toward end-sub node 130) and an upstream direction (from end-sub node 130 toward main node 110). For example, the frame buffer 112 of main node 110 may include an upstream receive buffer (US RX Buff) and a downstream transmit buffer (DS TX Buff). The frame buffer 122 of a mid-sub node 120 may include US RX Buff and a DS TX Buff as well as a downstream receive buffer (DS RX Buff) and an upstream transmit buffer (US TX Buff). The frame buffer 132 of the end-sub node 130 may include a DS RX Buff and an US TX Buff.

Each node 110, 120, 130 further includes one or more transceivers 106 (TX/RX). Each transceiver 106 is configured to generate a signal on a corresponding bus link 104 based on either the contents of the respective frame buffers 112 or 132 or based on the input signal from the other link in a mid-sub node with content that is selectively to be replaced by respective frame buffer 122 locations. In an aspect, the transmission on the bus links 104 are full duplex. That is the bus links 104 can simultaneously carry a downstream signal and an upstream signal. In some implementations, the communications utilize a carrier-based modulation scheme with echo-cancelation to achieve full duplexing. For example, the signals may use binary phase shift keying (BPSK), quadrature phase shift keying (QPSK) or Quad Amplitude Modulation (QAM).

In an aspect, the daisy-chain 102 may provide low latency due to no store-and-forward at each node. Data coming from the direction of the main node 110 is immediately forwarded toward the end-sub node 130. Data coming from the direction of the end-sub node 130 is immediately forwarded toward the main node. Each node selectively reads data when the data goes through the node. Each node also selectively changes the data without a store-and-forward of the whole frame or sections of the frame. For example, at a sub-node 120, the transceiver 106a receives a downstream signal 150 and selectively reads data to the DS RX buffer. The transceiver 106b selectively changes data in the downstream signal 150 (e.g., based on DS TX buffer and immediately forwards the downstream signal 150 toward end-sub node 130. Simultaneously, the transceiver 106b receives an uplink signal 152 and selectively reads data to the US RX buffer. The transceiver 106a selectively changes data in the upstream signal 152 and immediately forwards the upstream signal 152 toward main node 110. Accordingly, the frame buffer 122 does not store an entire frame before forwarding the frame to a next node, thereby providing low-latency communications. For example, data may be forwarded from the main node 110 to the end-sub node 130 within less than half of one sampling period, which may be, for example, 10.4 microseconds (μs).

In an aspect, the communications are synchronized according to a superframe structure. For example, the superframes may be transmitted on a 48 kHz cycle with each superframe being 20.82 μs. The payload in each frame may be 256 bytes for a data rate of 98.304 Mbps. Further details of synchronization and the frame structure are described below.

Additionally, each node may include a respective memory 114, 124, 134 for storing configuration information for the node. In some implementations, the memory 114, 124, 134 is an addressable register, a one-time programmable (OTP) memory, or an electronically erasable programmable memory (EEPROM) that stores an identifier of the node. In some implementations, the order of the nodes is flexible and a position of the node within the daisy-chain 102 may be determined during a discovery procedure based on the stored identifier.

In some implementations, one or more nodes may include or be connected to a respective microcontroller, microprocessor, or DSP (MCU) 116, 126, 136. For example, the MCU 116, 126, 136 may be connected to a node via a time division multiplexed (I2S/TDM) connection, Inter-Integrated Circuit (I2C), or serial peripheral interface (SPI). The MCU 116, 126, 136 may configure the respective node as well as communicate with the other nodes via the daisy-chain 102. For example, in an audio system, an audio source may originate from the DSP (MCU) in a main node 110. Some sub nodes 120 such as intelligent amplifiers may include an MCU, but other nodes such as subwoofers or microphone nodes may not include an MCU.

Figure 2:
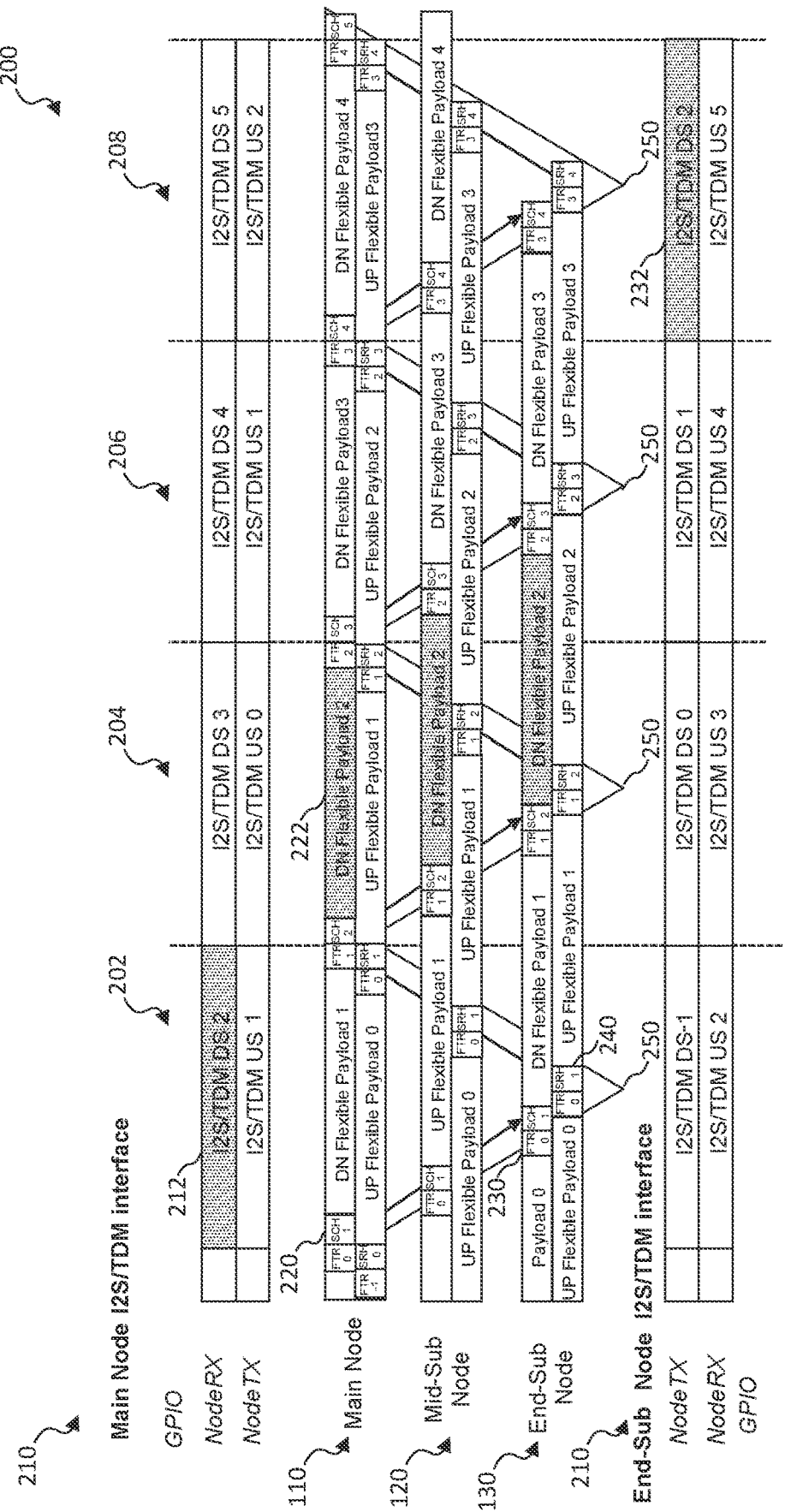
FIG. 2 is a timing diagram of synchronous communication for nodes in a daisy-chain, according to an aspect of the disclosure.

FIG. 2 is a timing diagram of synchronous communication for nodes in a daisy-chain 102. The communications may be transmitted with superframes within sample periods including a first sample period 202, a second sample period 204, a third sample period 206, and a fourth sample period 208. For example, the nodes include the main node 110, a mid-sub node 120, and an end-sub node 130. The downstream and upstream signals for each node are divided into a header (e.g., synchronization control header (SCH) or synchronization response header (SRH)), flexible payload bytes, and footer (FTR) in each superframe.

In some implementations, one or more of the nodes, e.g., main node 110 and end-sub node 130 may include other node components connected via a time division multiplexing (TDM) interface 210 such as I2S/TDM. For example, if the node is an audio node such as a microphone or speaker, an audio signal may be input or output to the daisy-chain 102 via the I2S/TDM interface. The I2S/TDM interface pins or other pins on the chip may alternatively be used as general purpose input-output (GPIO) pins at the node. The daisy-chain 102 may also be synchronized with the I2S/TDM interface 210 at the main node and provide synchronization at the respective I2S/TDM interfaces 210 to the sub nodes.

In an aspect, the main node 110 I2S/TDM sample may be synchronized with the superframe. For example, the main node 110 may transmit a SCH 220 at the start of each sample period. Due to transmission delay and processing at each node, each subsequent node may transmit the corresponding SCH slightly later within the sample period. The end-sub node 130 may receive a superframe ending with a FTR 230 within the same sample period and transmit an upstream frame beginning with an SRH 240. The upstream frame may be transmitted in the upstream direction at each node such that the SRH 240 is received at the main node 110 within the same sample period. Accordingly, the synchronization may provide control and response within one sample period.

Communications with the TDM interfaces may be synchronized and use an additional superframe. For example, as illustrated, a main node 110 may load transmit frame buffer content with an I2S/TDM data stream sample 212 during a first audio sample period 202 to build up a new superframe. The main node 110 may transmit the new downstream frame with the audio stream sample being part of the flexible payload 222 in the second sample period 204. The daisy-chain 102 may carry the flexible payload 222 to the end-sub node 130 in the second sample period 204 and third sample period 206. The end-sub node 130 may then transmit the audio stream inside the flexible payload 222 as an I2S/TDM frame 232 during the fourth sample period 208.

In an aspect, all of the nodes sample data at the same time (same phase) based on the received timing information. With the timing information each node is fully aware of the start 250 of the sampling period, which can be determined from the middle between dnSCH and upSRF−½ tsf). During the sampling period, each node may sample data from a source to a TX buffer for a flexible payload. For example, audio devices may sample an audio signal for an audio stream. In an aspect, the flexible payload may support other types of data such as control for a pulse width modulation (PWM) signal or data from an analog-to-digital converter (ADC), which may provide sensor data, for example.

In an implementation, a PWM duty cycle may be controlled by flexible payload bytes. For instance, a flexible payload for control of a PWM duty cycle allows an I2S/TDM interface e.g. from an Audio DSP in one node to directly control PWM duty cycle on another node. If PWM is used for audio influenced light effects (e.g., light organ), the audio DSP can directly control the LEDs with low latency based on its native processing without having to use asynchronous communication over I2C or SPI. PWM can also be used to control the output voltage of a voltage regulator, e.g. one that feeds the power rails of a class-D amplifier. When low level audio signals are expected, PWM can be set to create a low supply voltage and high supply voltage when high volume audio output is expected (look ahead control from the DSP). The PWM duty cycle can be controlled either asynchronously from the same node's or another node's I2C (from main node) or SPI (from any other node) interface or synchronously with lower latency over I2S/TDM from another node.

Figure 3:
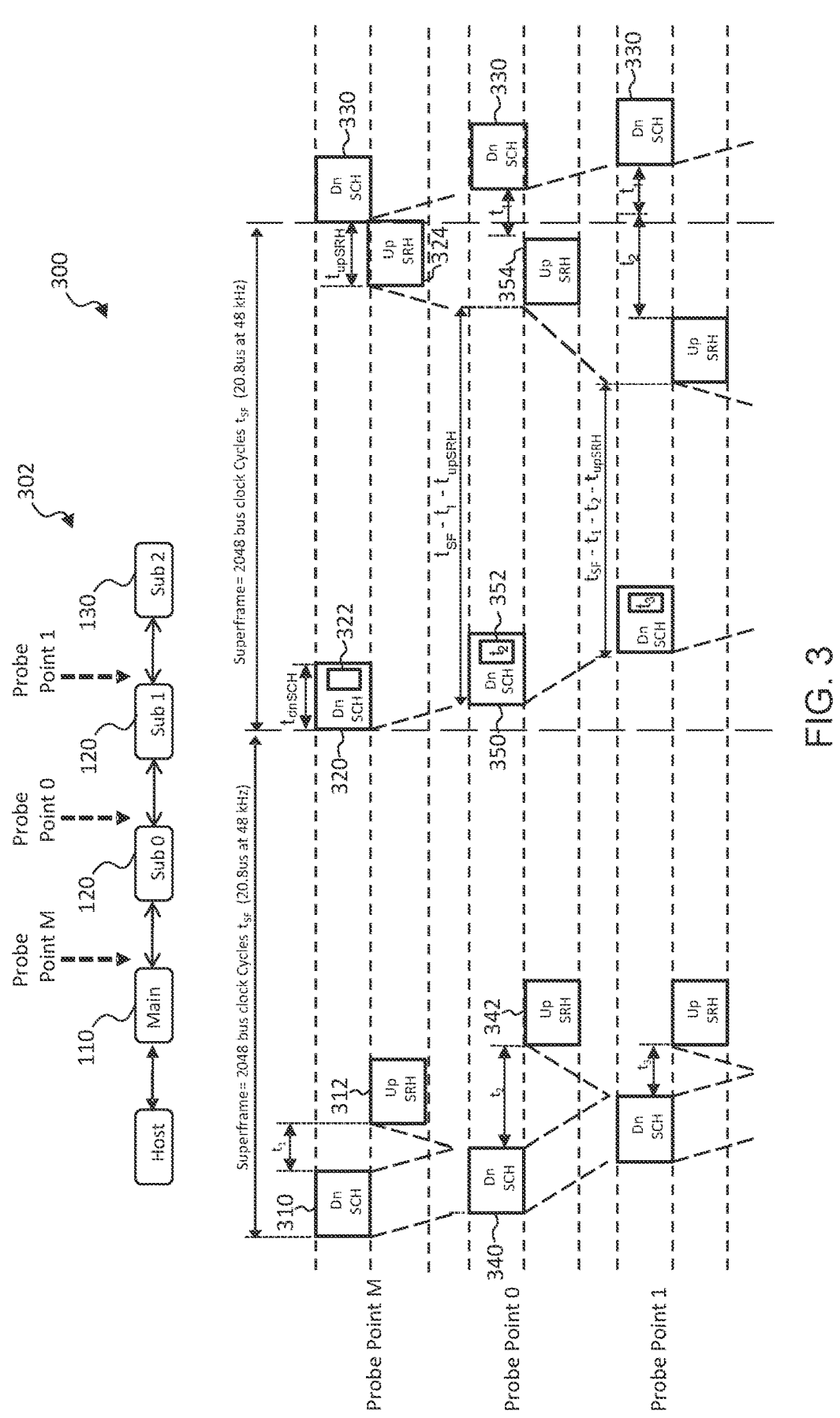
FIG. 3 is a diagram of a synchronization procedure for nodes in a daisy-chain; according to an aspect of the disclosure.

FIG. 3 is a diagram of a discovery procedure 300 for nodes in a daisy-chain 302. For example, the discovery procedure 300 can be used to establish the timing of the headers, flexible payload bytes, and footers at each node. In the illustrated example, a daisy-chain 302 includes a total of 4 nodes (e.g., with 2 mid-sub nodes 120), but additional nodes may be included. The signals for a probe point corresponding to each bus are illustrated.

The main node 110 may optionally perform line diagnostics and provide bus power to downstream sub node 0. The main node 110 starts sending downstream data in the form of a DnSCH 310 that includes a downstream lock pattern. When sub node 0 is in lock it starts responding with an UpSRH 312 that includes an upstream lock pattern. The main node 110 measures a delay time $t_1$ and sends DnSCH

320 with delay information 322 to sub node 0. The delay time $t_1$ represents cable delay of the bus link 104 plus receive and transmit path delay between nodes. Sub node 0 responds with a time adjusted UpSRH 324. For example, the time adjusted UpSRH 324 is synchronized to finish by the end of the main node's superframe before the next DnSCH 330 from the main node 110. For instance, the time adjusted UpSRH 324 may be transmitted $t_{SF}-t_1-t_{upSRH}$ after the DnSCH 320 is received at the sub node 0. $t_{SF}$ is the duration of a superframe, and $t_{upSRH}$ is the duration of the time adjusted UpSRH. Sub node 0 locks to the downstream signal from the main node 110.

The main node or sub node 0 optionally perform line diagnostics and provides bus power to downstream sub node 1. If all is well sub node 0 starts sending data downstream including DnSCH 340. When sub node 1 is in lock it starts responding with UpSRH 342. Sub node 0 measures delay time $t_2$ and sends DnSCH 350 with delay information 352 to sub node 1. Sub node 1 responds with time adjusted UpSRH 354. The time adjusted UpSRH 354 for sub node 1 is synchronized to end $t_1+t_2$ before the DnSCH 330 arrives at sub node 0. For instance, the time adjusted UpSRH 354 may be transmitted from sub node 1 at $t_{SF}-t_1-t_2-t_{upSRH}$ after the DnSCH 350 is received at the sub node 0. Accordingly, sub node 0 may receive the UpSRH 354 and retransmit as the time adjusted UpSRH 324. Now the main node 110 can talk with sub node 1.

The discovery procedure 300 continues for each sub node in the daisy-chain 302 using the same procedure at each node. It should be understood that the discovery procedure may be performed over multiple superframes. In an aspect, the number of nodes in the daisy-chain 302 may be based on a time budget. For example, the time budget may be expressed as:

$$t_{Budget}=t_{SF}-t_{SCH}-t_{SRH}-2\times(t_{Cable}+\#\text{Subs}\times t_{Proc})>0$$

Assuming a 1 us processing delay and 80 bits each for SCH and SRH at 98.304 Mbit/s, 9 sub nodes may be allowed with a maximum overall distance of 50 m, assuming cable latency $t_{cable}$ of 6.5 ns/m. For example, 9 sub nodes may be suitable for a vehicle entertainment system including microphones and speakers.

Figure 4:
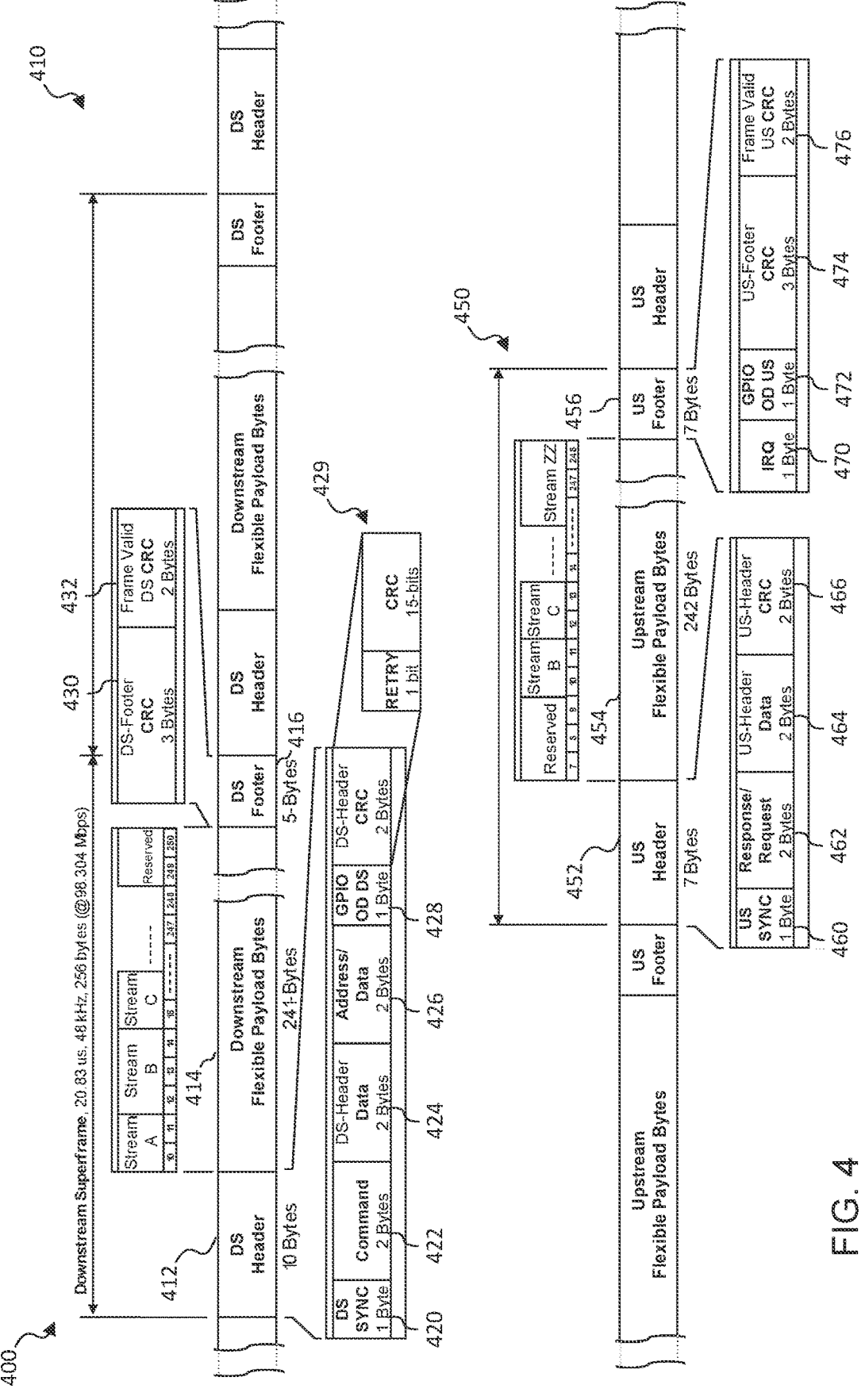
FIG. 4 is a diagram of examples of frame structures, according to an aspect of the disclosure.

FIG. 4 is a diagram 400 of examples of frame structures. The diagram 400 includes an example of a downstream superframe 410 and an example of an upstream superframe 450.

The downstream superframe 410 includes a downstream synchronization header 412, a downstream flexible payload 414, and a downstream footer 416. The downstream synchronization header 412 includes a downstream synchronization byte 420 with a modulo frame counter, a command field 422, data field 424, data or address field 426, GPIO over distance byte 428, retry-bit and CRC 429. The downstream flexible payload 414 includes a plurality of bytes that may be flexibly configured to carry data streams. For example, a stream mapping may indicate which bytes of the downstream flexible payload 414 carry each stream. Further details of the flexible payload 414 are described with respect to FIG. 7. The downstream footer 416 includes a CRC 430 for the downstream flexible payload 414 and a frame valid indication 432 with its own CRC.

The downstream synchronization byte 420 indicates the start of a frame and includes a modulo frame counter value. The command field 422 provides for control signaling and addresses a node. The data field 424 and data or address fields 426 depend on the command field 422. The GPIO over distance byte 428 indicates the status of one or more virtual GPIO pins as discussed in further detail with respect to FIG. 5. The CRC 429 is a CRC of the downstream header 412 including a retry bit and 15 bit CRC. The CRC 430, in the downstream footer 416, provides a CRC for the downstream flexible payload 414.

The frame valid indication 432 is an indication with separate CRC bits that indicates whether the downstream frame was valid when it arrived at the previous node. For example, a sub node may check the CRC 430 and determine that the received flexible payload is not valid. The sub node, however, may have data to transmit on the flexible payload and calculate a new CRC 430. Accordingly, the frame transmitted by the sub node may have a correct CRC 430, but the frame valid indication 432 may indicate that other data in the flexible payload is not valid.

The upstream superframe 450 includes an upstream header 452, an upstream flexible payload 454, and an upstream footer 456. The upstream header 452 includes an upstream synchronization byte 460, a response/request field 462, data field 464, and a header CRC 466. Similar to the downstream flexible payload 414, the upstream flexible payload 454 includes a plurality of bytes that may be flexibly configured to carry data streams. The upstream flexible payload 454 may be defined by the same or different stream map in regards to the downstream stream map and the stream mapping may be different between each node. The upstream footer 456 includes an interrupt request (IRQ) byte 470, a GPIO byte 472, a CRC 474 for the upstream flexible payload 454, and a frame valid indication 476 with its own CRC.

The upstream synchronization byte 460 indicates the start of an upstream superframe 450. The response/request field 462 is a response to a command field 422 or a request for control signaling. Data field 464 is defined based on the response/request field 462. The header CRC 466 is calculated based on the content of the upstream header 452. The interrupt request byte 470 indicates an interrupt request detected at a downstream node. The GPIO byte 472 indicates the status of the one or more virtual GPIO pins at downstream nodes. The CRC 474 is calculated based on the upstream flexible payload 454. The frame valid indication 476 operates in the same manner as the frame valid indication 432 but for the upstream direction. In some cases, a node may not receive an upstream header 452 from a downstream node (e.g., if the downstream node becomes disconnected). The node may generate an upstream frame including a new UpSRH in the absence of a received UpSRH from the downstream node.

Figure 5:
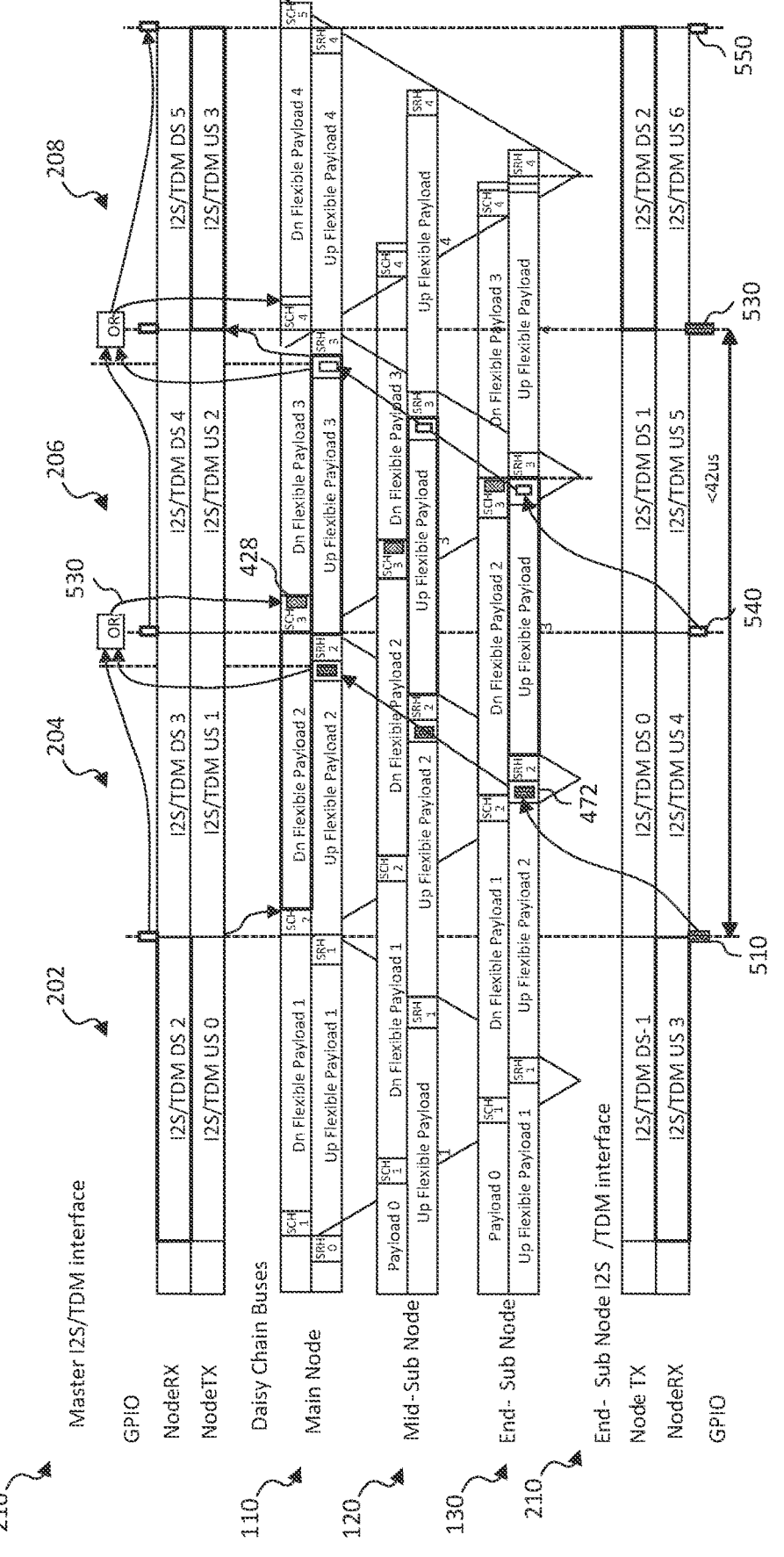
FIG. 5 is a diagram of general purpose input-output (GPIO) handling, according to an aspect of the disclosure.

FIG. 5 is a diagram of GPIO handling in a daisy-chain 102. Each node in the daisy-chain 102 may be associated with a plurality of virtual GPIO pins. The GPIO over distance bytes 428 and 472 may indicate an update to the status of virtual GPIO pins. Each node may be configured to output the virtual pin information on their GPIO output pins. In some cases, a logical operation such as inversion, logical AND, or a logical OR may be applied to the status of the virtual GPIO pins and local GPIO pins. For example, where inversion is applied to the local GPIO pins, a logical AND operation may be applied to combine the status of the virtual GPIO pins and the local GPIO pins. If no inversion is applied, a logical OR may be applied to combine the status of the virtual GPIO pins and the local GPIO pins. The combined status of the virtual GPIO pins is included in the transmitted GPIO over distance bytes 428 and 472. More than 8 virtual GPIO pins are supported when the GPIO byte association alternates between different sets of virtual GPIO pins e.g., by alternating during the uneven and even frame counter values.

For example, during the first sample period 202, both the main node 110 and the end-sub node 130 may detect a GPIO status update on their GPIO input pins. The end-sub node 130 may indicate the GPIO status update 510 in the GPIO over distance byte 472 in the footer 456 transmitted in the second sample period 204. Other sub nodes may contribute by logically OR combining their GPIO input pin status with the upstream GPIO byte and forwarding the updated GPIO byte upstream. The footer may reach the main node 110 in the second sample period 204. At the end of the second sample period 204, the main node 110 may perform a logical operation (e.g., logical OR) with its GPIO input pin status during the first sample period to determine the updated status of the virtual GPIO pins. In the third sample period 206, the main node 110 may indicate the status 530 of the virtual GPIO pins (e.g., result of logical OR) in the header. Accordingly, each of the nodes may receive the virtual GPIO status register update in the third sample period 206 for update on the GPIO output pins concurrently with the start of the fourth sample period 208.

Therefore, within three superframes of an input GPIO pin changing, the status is being received at any node for output on a GPIO pin. For instance, the end-sub node 130 may output the status 530 in the fourth sample period 208. An alternate virtual GPIO byte and associated set of GPIO pins may sample pins at the end of the second sample period 204 for output at the start of the fifth sample period.

Figures 6A, 6B:
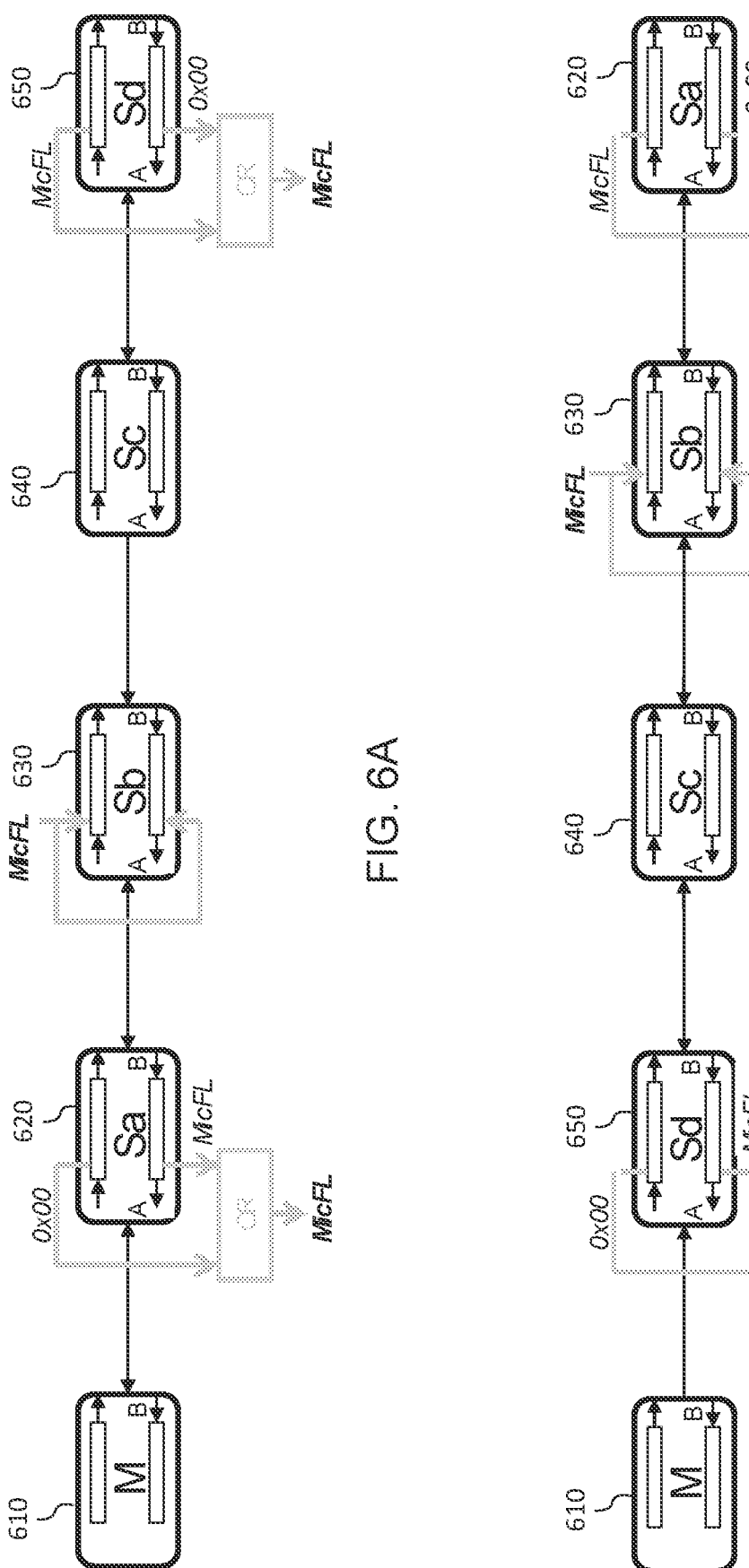
FIGS. 6A and 6B are diagrams of examples of flexible node ordering, according to an aspect of the disclosure.

FIGS. 6A and 6B are diagrams of examples of flexible node ordering. In FIG. 6A, for example, a main node 610 may be connected to a second node 620, a third node 630, a fourth node 640, and a fifth node 650 in a daisy-chain. The third node 630 may be a microphone. The second node 620 and the fifth node 650 may utilize the microphone signal. In an aspect, the third node 630 may transmit the microphone signal in both the upstream and downstream directions. The second node 620 and the fifth node 650 may be configured to listen to both the upstream direction and the downstream direction.

In FIG. 6B, the nodes may be connected in a different order. For example, the main node 610 may be connected to the fifth node 650, the fourth node 640, the third node 630, then the second node 620. The third node 630 may transmit the microphone signal in both the upstream and downstream directions. The second node 620 and the fifth node 650 may be configured to listen to both the upstream direction and the downstream direction. Accordingly, the second node 620 and the fifth node 650 may receive the microphone signal within a superframe regardless of the node order.

Figure 7:
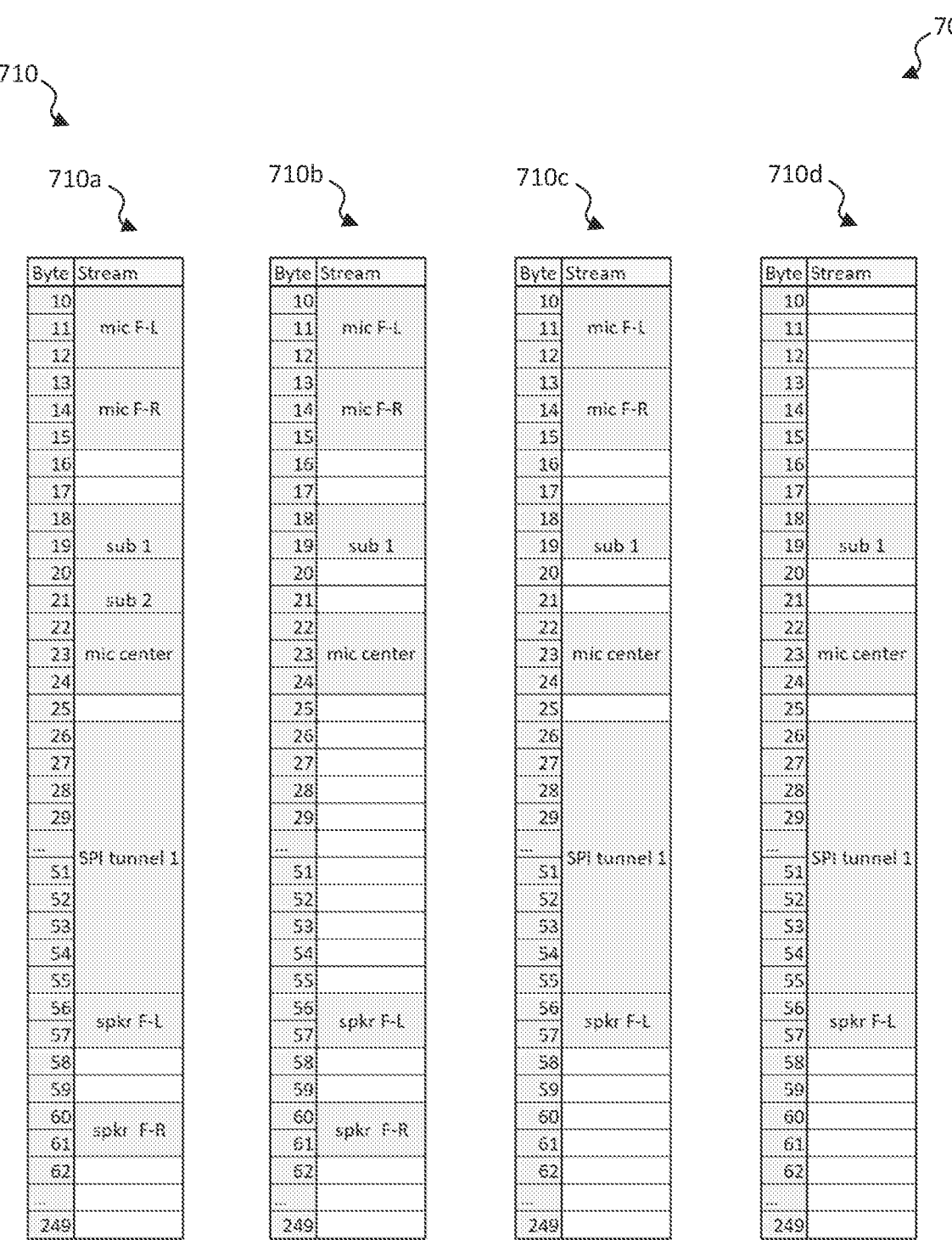
FIG. 7 is a diagram of an example stream mapping for a flexible payload, according to an aspect of the disclosure.

FIG. 7 is a diagram 700 of example flexible payload stream mappings 710 with a stream mapping 710a being a superset of different subsets 710b, 710c, 710d for different vehicle models or implementations. In an aspect, the flexible payload carries a plurality of streams transmitted by different nodes. Each stream may be assigned to a number of bytes in the flexible payload depending on the bandwidth of the stream. The node that contributes a stream or streams to the flexible payload writes data to the assigned flexible payload byte locations. The nodes that uses the stream or streams can read the bytes from the assigned flexible payload byte locations.

In some implementations such as a vehicle audio system, the stream may include one or more of an audio stream, a serial peripheral interface (SPI) tunnel, an Ethernet tunnel, or a mailbox tunnel. For example, the audio stream may use 16-bit words, 24-bit words, or 32-bit words. In some implementations, the flexible payload may carry 239 bytes. Accordingly, multiple audio streams (e.g., mic F-L, mic F-R, sub1, sub2 mic center, spkr F-L. and spkr F-R may be carried in the flexible payload. In some implementations, each stream mapping 710 is the same at every node. For instance, every node may follow stream mapping 710a, which includes all of the streams. A node may simply ignore data for a stream that is not relevant for the node. In other implementations, additional bandwidth may be available if the stream mapping for adjacent nodes repurposes one or more bytes that are not used by the adjacent nodes or if a different mapping between upstream and downstream is used. However, multiple stream mappings increase complexity of the communication system and may reduce flexible ordering.

A 10 Mbit/s SPI tunnel or Ethernet tunnel may utilize 30 bytes of the flexible payload upstream and downstream. A mailbox tunnel may occupy 10 bytes upstream and downstream. Not every node needs to participate in a tunnel. For example, a node configured with mapping 710a may not participate in the SPI tunnel. There can be multiple SPI, Ethernet, and mailbox tunnels mapped onto the flexible payload and a node's participation in these tunnel may be limited by the interfaces of the transceiver chip in the node. The mailbox tunnel may provide for simple message exchanges between nodes by providing the communication between a transmit mailbox on one node to a receive mailbox on an addressed node and vice versa.

In some implementations, the stream mappings 710 may be the same in each direction. In some implementations, it may be possible to optimize bandwidth using different stream mappings each direction, for example, if a main node 110 or end-sub node 130 only needs to transmit in one direction. For instance, if the main node 110 is the only source for an output audio stream and no feedback is needed, the upstream payload may carry a different stream from the end-sub node 130.

Figure 8:
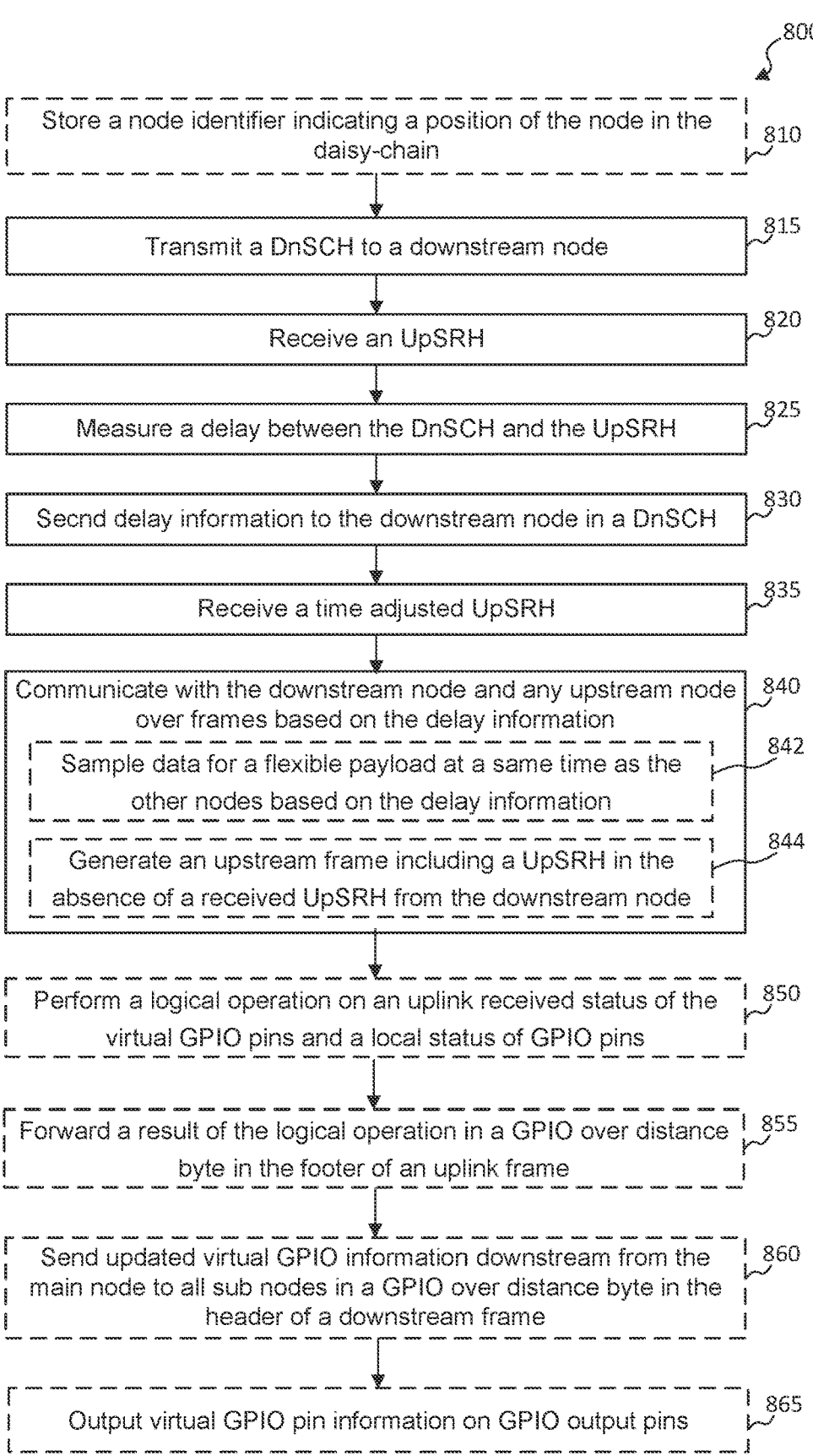
FIG. 8 is a flowchart of an example method performed by a node in a daisy-chain, according to an aspect of the disclosure.

FIG. 8 is a flowchart of an example method 800 performed by a node (e.g., main node 110 or sub node 120) in a daisy-chain 102. The method 800 may synchronize the nodes in the daisy-chain 102 for communication. The method 800 may be performed in communication with another node in the daisy-chain 102 (e.g., sub node 120 or end-sub node 130).

In block 810, the method 800 may optionally include storing a node identifier indicating a position of the node in the daisy-chain. For example, in some implementations, the main node 110 may store the node identifier indicating a position of the node in the daisy-chain within the memory 114. The node identifier may be enumerated during a discovery procedure.

In block 815, the method 800 includes transmitting a DnSCH to a downstream node. For example, in some implementations, the main node 110 may transmit the DnSCH 310 to a downstream node (e.g. sub node 120).

In block 820, the method 800 includes receiving an UpSRH from the downstream node. For example, in some implementations, the main node 110 may receive the UpSRH 312 from the downstream node (e.g, sub node 120).

In block 825, the method 800 includes measuring a delay between the DnSCH and the UpSRH. For example, in some implementations, the main node 110 may measure a delay ($t_1$) between the DnSCH 310 and the UpSRH 312.

In block 830, the method 800 includes sending delay information to the downstream node in a DnSCH. For example, in some implementations, the main node 110 may send delay information 322 to the downstream node 120 in a DnSCH 320.

In block 835, the method 800 includes receiving a time adjusted UpSRH. For example, in some implementations, the main node 110 may receive the time adjusted UpSRH 324.

In block 840, the method 800 includes communicating with the downstream node and any upstream node over frames based on the delay information. For example, in some implementations, the main node 110 may communicate with the downstream node (e.g., sub node 120) over superframes 410 or 450 based on the delay information. As another example, the sub node 120 may communicate with the end-sub node 130 and the main node 110 over superframes 410 or 450 based on the delay information. In some implementations, at sub-block 842, the block 840 may optionally include sampling data for a flexible payload at a same time as the other nodes based on the delay information. For example, each node may sample data at the start 250 of the sampling period. In some implementations, at sub-block 844, the block 840 may optionally include generating an upstream frame including a UpSRH in the absence of a received UpSRH from the downstream node.

In block 850, the method 800 may optionally include performing a logical operation on an uplink received status of virtual GPIO pins and a local status of GPIO pins. For example, in some implementations, the main node 110 may perform a logical operation (e.g., inversion, logical AND, or logical OR) on the uplink received status of virtual GPIO pins (e.g., GPIO status update 510) indicated in GPIO byte 470 in a header of an uplink frame.

In block 855, the method 800 may optionally include forwarding a result of the logical operation in a GPIO over distance byte in the footer of an uplink frame. For example, a sub node may forward the GPIO over distance byte 472 including the result of the logical operation to an upstream node in the footer 456.

In block 860, the method 800 may optionally include sending updated virtual GPIO information downstream from the main node to all sub nodes in a GPIO over distance byte in the header of a downstream frame. For example, the main node 110 may send the updated virtual GPIO information downstream to all sub nodes with the downstream GPIO over distance byte 428 in the header 412.

In block 865, the method 800 may optionally include outputting virtual GPIO pin information on GPIO output pins. For example, in some implementations, the main node 110 may output virtual GPIO pin information on GPIO output pins.

Figure 9:
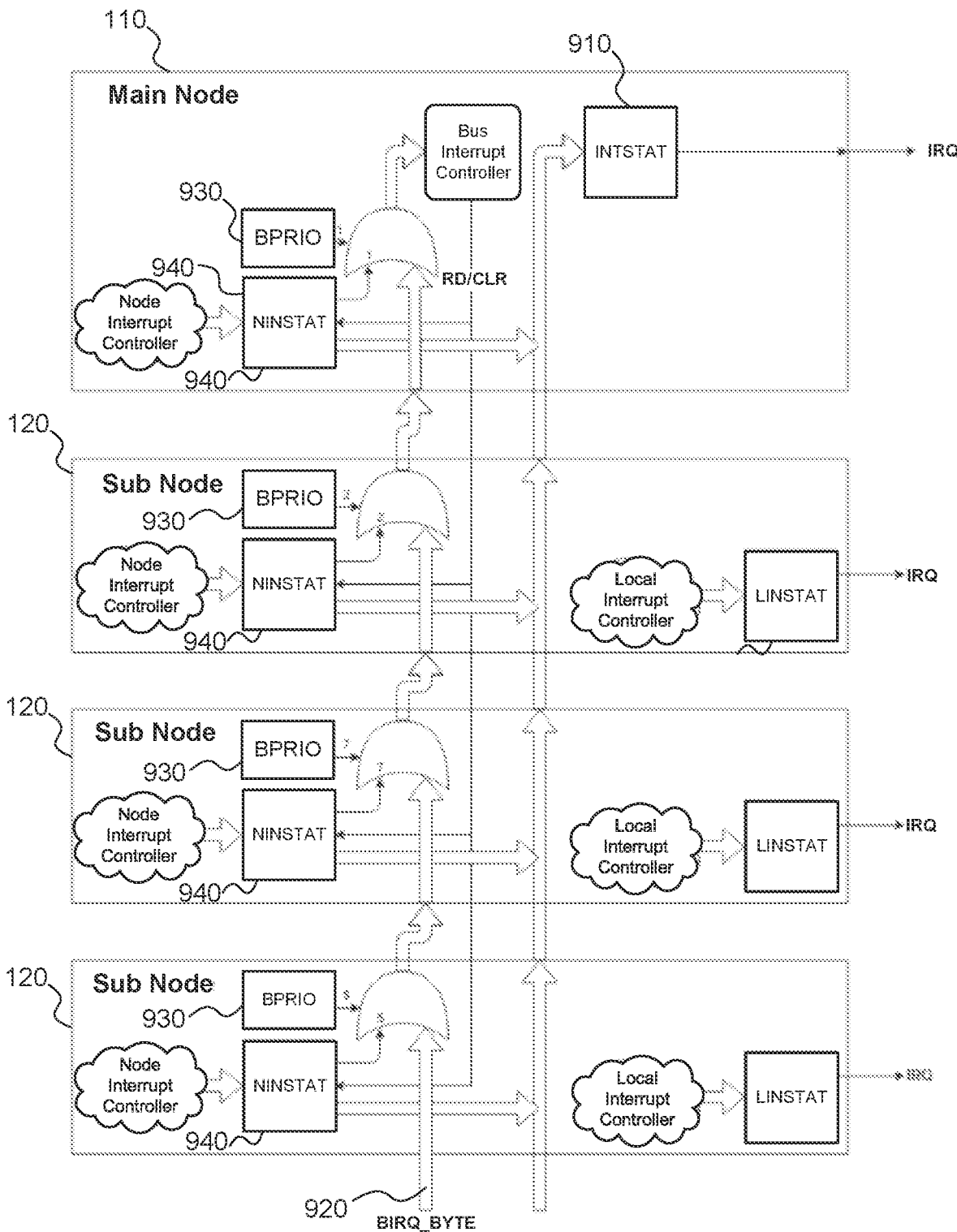
FIG. 9 is a diagram of an example of interrupt over distance operation in a daisy-chain using an interrupt request byte, according to an aspect of the disclosure.

FIG. 9 is a diagram 900 of an example of interrupt over distance operation in a daisy-chain 102 using the IRQ byte 470. 128 interrupt requests can be enabled and prioritized with two levels of priority on each node. Nodal interrupts support 1 of 8 levels of prioritization at the main node and local interrupt selection for IRQ pin on all sub nodes. A host only needs to access to a main node INTSTAT register 910 to determine a node and source of a highest priority interrupt. Pending interrupts are automatically cleared once selected as the highest priority interrupt, which allows for minimal "on deck" interrupt latency once the host processes the primary interrupt.

All nodes share 8 wired OR Bus Interrupt Request (BIRQ) byte 920. A BIRQ value is sent in the payload section of upstream response frames (e.g., in the IRQ byte 470 of footer 456) and is protected by a payload CRC 474. Each node ORs its nodal interrupt request bit into a bit of the incoming BIRQ value; the bit position is specified by the BIRQ_PRIO[2:0] field in a NINT_CTL register at the node. The combined BIRQ value is transmitted upstream in the payload section (e.g., IRQ byte 470) of the upstream super-frame 450.

A sub node 120 is configured to send a node interrupt request to the main node 110 by setting a bit, specified Bus Interrupt Request Priority Field (BPRIO) value 930 (a three bit field) of the NINTCTL register, in the IRQ byte 470 of upstream response frames. The local BIRQ will be ORed with the incoming IRQ byte 470 from the downstream sub node 120 before being sent out in the upstream superframe 450. When the main node 110 receives a valid incoming IRQ byte 470 (both payload and frame valid), the main node ORs the incoming IRQ byte 470 with the local BIRQ byte. If any bits are set in the merged BIRQ byte, the main node will first check to see if the BPRIO value 930 for the main node matches the highest priority interrupt request bit and if the main NIRQ bit is set. If so, the main node NINTSTAT value 940 will be loaded into the INTSTAT register 910 and will assert the IRQ pin to notify an external host of a pending interrupt. This will also clear the INTPND[N].pndN bit that caused the interrupt request.

If the main node 110 is not the source of the highest priority interrupt, the main node will send a broadcast SCH BIRQ query to all sub nodes (e.g., in command field 422), requesting more information about the highest priority interrupt request bit (0 is the highest and bit 7 is the lowest). Sub nodes 120 with an active interrupt request set in NINSTAT register 940 and matching BPRIO priority to the SCH BIRQ query, will respond with an SRH packet (e.g., in response/request field 462) that contains the data in the NINTSTAT register 940. If multiple sub nodes have matching BPRIO priority and pending interrupt requests, the node closest to the main node (main included) will have priority. Note, all matching sub nodes will respond with an SRH, but the SRH of the closest nodes will supersede downstream SRHs.

When a valid SRH response is received by the main node 110, the main node will store the returned NINTSTAT information locally in the INTSTAT register 910 and will assert its IRQ pin to notify an external host of a pending interrupt. The main node will then read the NINTSTAT register 940 on the responding node to clear NINTSTAT-.IRQ bit. This will also clear the INTPND[N].pndN bit that caused the interrupt request. The main node will ignore incoming BIRQ bytes until an external host has read its INTSTAT register 910. At which time it will respond to any active interrupt request bits with the above procedure.

Example aspects are described in the following numbered clauses:

Clause 1. A node connected in a daisy-chain over full duplex links to one or more other nodes, the node configured to: transmit a downstream synchronization control header (DnSCH) to a downstream node; receive an upstream synchronization response header (UpSRH); measure a delay between the DnSCH and the UpSRH; send delay information to the downstream node in a DnSCH; receive a time adjusted UpSRH; and communicate with the downstream node and any upstream node over frames based on the delay information.

Clause 2. The node of clause 1, wherein communication uses full duplex carrier-based modulation on an upstream signal and a downstream signal over the full duplex links.

Clause 3. The node of clause 1 or 2, wherein to communicate with the downstream node and any upstream node, the node is configured to sample data for a flexible payload at a same time as the other nodes based on the delay information.

Clause 4. The node of any of clauses 1-3, wherein each frame includes: a header; a flexible payload defined by a stream mapping that assigns byte locations within the flexible payload to a stream; and a footer.

Clause 5. The node of clause 4, wherein for a downstream frame, the header is the DnSCH and includes: a synchronization byte with a modulo frame counter, a command field, data field, a data or address field, a general purpose input output (GPIO) over distance byte, and a cyclic redundancy check for the header; and the footer includes: cyclic redundancy check (CRC) bytes for the flexible payload and a frame valid indication with separate CRC bits.

Clause 6. The node of clause 4 or 5, wherein for an upstream frame, the header is the UpSRH and includes a synchronization byte, a response/request field, data field, and a cyclic redundancy check for the header, and the footer includes an interrupt request (IRQ) byte, a general purpose input output (GPIO) byte, CRC bytes for the flexible payload, and a frame valid indication with separate CRC bits.

Clause 7. The node of clause 6, wherein the GPIO over distance byte indicates an update to a status of virtual GPIO pins, wherein the node is configured to output virtual GPIO pin information on GPIO output pins.

Clause 8. The node of clause 7, wherein the node is configured to: perform a logical operation on an uplink received status of the virtual GPIO pins and a local status of GPIO pins; forward a result of the logical operation in a GPIO over distance byte in the footer of an uplink frame; and send updated virtual GPIO information downstream from a main node to all sub nodes in a GPIO over distance byte in the header of a downstream frame.

Clause 9. The node of clause 7 or 8, wherein the GPIO over distance byte changes between multiple sets of virtual GPIO pins every frame to support more than 8 virtual GPIO pins.

Clause 10. The node of clause 9, wherein the frame valid indication with cyclic redundancy check indicates whether the frame was valid when received at a previous node.

Clause 11. The node of clause 9 or 10, wherein the IRQ byte indicates an interrupt request detected at a downstream node.

Clause 12. The node of clause 11, wherein the node is configured to select a position of the IRQ byte to indicate a local interrupt based on a priority of the local interrupt.

Clause 13. The node of any of clauses 9-12, wherein the node is configured to generate an upstream frame including a UpSRH in an absence of a received UpSRH from the downstream node.

Clause 14. The node of any of clauses 4-13, wherein the flexible payload includes one or more of: an audio stream; control for a pulse width modulation duty cycle; a stream from an analog to digital converter (ADC) at a node; a serial peripheral interface (SPI) tunnel; an ethernet tunnel; or a mailbox tunnel.

Clause 15. The node of any of clauses 4-14, wherein the flexible payload bytes are zeroes if not sourced.

Clause 16. The node of any of clauses 4-15, wherein to communicate with the downstream node and any upstream node, the node is configured to simultaneously transmit streams at a same flexible payload locations upstream and downstream.

Clause 17. The node of any of clauses 4-16, wherein to communicate with the downstream node and any upstream node, the node is configured apply a logical OR operation between upstream streams and downstream streams of a same position in the flexible payload.

Clause 18. The node of any of clauses 1-17, wherein the node is configured to store a node identifier indicating a position of the node in the daisy-chain.

Clause 19. The node of any of clauses 1-18, wherein to communicate with the downstream node and any upstream node, the node is configured to: immediately forward information received in a downstream frame to the downstream node; immediately forward information received in an upstream frame to the upstream node; and selectively read or write data to the upstream frame or the downstream frame.

Clause 20. A method of operating a node connected in a daisy-chain over full duplex links to one or more other nodes, comprising: transmitting a downstream synchronization control header (DnSCH) to a downstream node; receiving an upstream synchronization response header (UpSRH); measuring a delay between the DnSCH and the UpSRH; sending delay information to the downstream node in a DnSCH; receiving a time adjusted UpSRH; and communicating with the downstream node and any upstream node over frames based on the delay information.

Clause 21. The method of clause 20, wherein the communicating uses full duplex carrier-based modulation on an upstream signal and a downstream signal over the full duplex links.

Clause 22. The method of clause 20 or 21, wherein communicating with the downstream node and any upstream node comprises sampling data for a flexible payload at a same time as the other nodes based on the delay information.

Clause 23. The method of any of clauses 20-22, wherein each frame includes: a header; a flexible payload defined by a stream mapping that assigns byte locations within the flexible payload to a stream; and a footer.

Clause 24. The method of clause 23, wherein for a downstream frame, the header is the DnSCH and includes: a synchronization byte with a modulo frame counter, a command field, data field, a data or address field, a general purpose input output (GPIO) over distance byte, and a cyclic redundancy check for the header; and the footer includes: cyclic redundancy check (CRC) bytes for the flexible payload and a frame valid indication with separate CRC bits.

Clause 25. The method of clause 23 or 24, wherein for an upstream frame, the header is the UpSRH and includes a synchronization byte, a response/request field, data field, and a cyclic redundancy check for the header, and the footer includes an interrupt request (IRQ) byte, a general purpose input output (GPIO) over distance byte, CRC bytes for the flexible payload, and a frame valid indication with separate CRC bits.

Clause 26. The method of clause 25, wherein the GPIO over distance byte indicates an update to a status of virtual GPIO pins, the method further comprising outputting virtual GPIO pin information on GPIO output pins.

Clause 27. The method of clause 26, further comprising: performing a logical operation on an uplink received status of the virtual GPIO pins and a local status of GPIO pins; forwarding a result of the logical operation in the GPIO over distance byte in the footer of an uplink frame; and including a result of the logical operation in the GPIO over distance byte to the downstream node.

Clause 28. The method of any of clauses 25-27, wherein the frame valid indication with separate CRC bits indicates whether the frame was valid when received at a previous node.

Clause 29. The method of any of clauses 25-28, wherein the IRQ byte indicates a priority of an interrupt request detected at a downstream node.

Clause 30. The method of any of clauses 25-29, wherein the communicating comprises generating an upstream frame including a UpSRH in an absence of a received UpSRH from the downstream node.

Clause 31. The method of any of clauses 23-30, wherein the flexible payload includes one or more of: an audio stream; control for a pulse width modulation duty cycle; a stream from an analog to digital converter (ADC) at a node; a serial peripheral interface (SPI) tunnel; an ethernet tunnel; or a mailbox tunnel.

Clause 32. The method of any of clauses 20-32, further comprising storing a node identifier indicating a position of the node in the daisy-chain.

Clause 33. A communication system comprising: a plurality of nodes connected in a daisy-chain via respective bus links, wherein the plurality of nodes are configured for full duplex, synchronized communication via a carrier-based modulation scheme over the bus links, wherein to synchronize the nodes a main node transmits a downstream synchronization header in a downstream direction at a start of a superframe and each sub node in the plurality of nodes transmits an upstream response header with a timing that is adjusted based on a delay in receiving the downstream synchronization header and a delay for the upstream response header to reach the main node by an end of the superframe.

Clause 34. The communication system of clause 33, wherein an order of the plurality of nodes is enumerated during a discovery procedure.

Clause 35. The communication system of clause 33 or 34, wherein a number of nodes in the communication system is limited based on time budget of a length of a superframe including a time for the downstream synchronization header, a time for the upstream response header, a cable delay, and a time for processing at each sub-node in each direction.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, scripts, software modules, applications, software applications, software packages, routines, subroutines, objects, executables, threads of execution, procedures, functions, etc., whether referred to as software, firmware, middleware, microcode, hardware description language, or otherwise.

Accordingly, in one or more aspects, one or more of the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media. Non-transitory computer-readable media excludes transitory signals.

The invention claimed is:

1. A node connected in a daisy-chain over full duplex links to one or more other nodes, the node configured to:
transmit a downstream synchronization control header (DnSCH) to a downstream node on a first full duplex link;
receive an upstream synchronization response header (UpSRH) on the first full duplex link;
measure a delay between the DnSCH and the UpSRH;
send delay information to the downstream node in a DnSCH;
receive a time adjusted UpSRH on the first full duplex link; and
communicate with the downstream node and any upstream node over frames based on the delay information.

2. The node of claim 1, wherein communication uses full duplex carrier-based modulation on an upstream signal and a downstream signal over the full duplex links.

3. The node of claim 1, wherein to communicate with the downstream node and any upstream node, the node is configured to sample data for a flexible payload at a same time as the other nodes based on the delay information.

4. The node of claim 1, wherein each frame includes:
a header;
a flexible payload defined by a stream mapping that assigns byte locations within the flexible payload to a stream; and
a footer.

5. The node of claim 4, wherein for a downstream frame of the frames, the header is the DnSCH and includes:
a synchronization byte with a modulo frame counter, a command field, data field, a data or address field, a general purpose input output (GPIO) over distance byte, and a cyclic redundancy check for the header; and
the footer includes: cyclic redundancy check (CRC) bytes for the flexible payload and a frame valid indication with separate CRC bits.

6. The node of claim 4, wherein for an upstream frame of the frames, the header is the UpSRH and includes a synchronization byte, a response/request field, data field, and a cyclic redundancy check for the header, and the footer includes an interrupt request (IRQ) byte, a general purpose input output (GPIO) byte, CRC bytes for the flexible payload, and a frame valid indication with separate CRC bits.

7. The node of claim 6, wherein the GPIO over distance byte indicates an update to a status of virtual GPIO pins, wherein the node is configured to output virtual GPIO pin information on GPIO output pins.

8. The node of claim 7, wherein the node is configured to:
perform a logical operation on an uplink received status of the virtual GPIO pins and a local status of GPIO pins;
forward a result of the logical operation in a GPIO over distance byte in the footer of an uplink frame; and
send updated virtual GPIO information downstream from a main node of a plurality of nodes in the daisy-chain to all sub nodes of the plurality of nodes in a GPIO over distance byte in the header of a downstream frame.

9. The node of claim 7, wherein the GPIO over distance byte changes between multiple sets of virtual GPIO pins every frame to support more than 8 virtual GPIO pins.

10. The node of claim 9, wherein the frame valid indication with cyclic redundancy check indicates whether the frame was valid when received at a previous node.

11. The node of claim 9, wherein the IRQ byte indicates an interrupt request detected at a downstream node.

12. The node of claim 11, wherein the node is configured to select a position of the IRQ byte to indicate a local interrupt based on a priority of the local interrupt.

13. The node of claim 9, wherein the node is configured to generate an upstream frame including a UpSRH in an absence of a received UpSRH from the downstream node.

14. The node of claim 4, wherein the flexible payload includes one or more of:
an audio stream;
control for a pulse width modulation duty cycle;
a stream from an analog to digital converter (ADC) at a node;
a serial peripheral interface (SPI) tunnel;
an ethernet tunnel; or
a mailbox tunnel.

15. The node of claim 4, wherein the flexible payload bytes are zeroes if not sourced.

16. The node of claim 4, wherein to communicate with the downstream node and any upstream node, the node is configured to simultaneously transmit streams at a same flexible payload locations upstream and downstream.

17. The node of claim 4, wherein to communicate with the downstream node and any upstream node, the node is configured apply a logical OR operation between upstream streams and downstream streams of a same position in the flexible payload.

18. The node of claim 1, wherein the node is configured to store a node identifier indicating a position of the node in the daisy-chain.

19. The node of claim 1, wherein to communicate with the downstream node and any upstream node, the node is configured to:
immediately forward information received in a downstream frame to the downstream node;
immediately forward information received in an upstream frame to the upstream node; and
selectively read or write data to the upstream frame or the downstream frame.

20. A method of operating a node connected in a daisy-chain over full duplex links to one or more other nodes, comprising:
transmitting a downstream synchronization control header (DnSCH) to a downstream node on a first full duplex link;
receiving an upstream synchronization response header (UpSRH) on the first full duplex link;
measuring a delay between the DnSCH and the UpSRH;
sending delay information to the downstream node in a DnSCH;
receiving a time adjusted UpSRH on the first full duplex link; and
communicating with the downstream node and any upstream node over frames based on the delay information.

21. The method of claim 20, wherein the communicating uses full duplex carrier-based modulation on an upstream signal and a downstream signal over the full duplex links.

22. The method of claim 20, wherein communicating with the downstream node and any upstream node comprises sampling data for a flexible payload at a same time as the other nodes based on the delay information.

23. The method of claim 20, wherein each frame includes:
a header;
a flexible payload defined by a stream mapping that assigns byte locations within the flexible payload to a stream; and
a footer.

24. The method of claim 23, wherein for a downstream frame of the frames, the header is the DnSCH and includes:
a synchronization byte with a modulo frame counter, a command field, data field, a data or address field, a general purpose input output (GPIO) over distance byte, and a cyclic redundancy check for the header; and
the footer includes: cyclic redundancy check (CRC) bytes for the flexible payload and a frame valid indication with separate CRC bits.

25. The method of claim 23, wherein for an upstream frame of the frames, the header is the UpSRH and includes a synchronization byte, a response/request field, data field, and a cyclic redundancy check for the header, and the footer includes an interrupt request (IRQ) byte, a general purpose input output (GPIO) over distance byte, CRC bytes for the flexible payload, and a frame valid indication with separate CRC bits.

26. The method of claim 25, wherein the GPIO over distance byte indicates an update to a status of virtual GPIO pins, the method further comprising outputting virtual GPIO pin information on GPIO output pins.

27. The method of claim 26, further comprising:
performing a logical operation on an uplink received status of the virtual GPIO pins and a local status of GPIO pins;
forwarding a result of the logical operation in the GPIO over distance byte in the footer of an uplink frame; and
including a result of the logical operation in the GPIO over distance byte to the downstream node.

28. The method of claim 25, wherein the frame valid indication with separate CRC bits indicates whether the frame was valid when received at a previous node.

29. The method of claim 25, wherein the IRQ byte indicates a priority of an interrupt request detected at a downstream node.

30. The method of claim 25, wherein the communicating comprises generating an upstream frame including a UpSRH in an absence of a received UpSRH from the downstream node.

31. The method of claim 23, wherein the flexible payload includes one or more of:
an audio stream;
control for a pulse width modulation duty cycle;
a stream from an analog to digital converter (ADC) at a node;
a serial peripheral interface (SPI) tunnel;
an ethernet tunnel; or
a mailbox tunnel.

32. The method of claim 20, further comprising storing a node identifier indicating a position of the node in the daisy-chain.

33. A communication system comprising:
a plurality of nodes including a main node and sub nodes connected in a daisy-chain via respective bus links, wherein the plurality of nodes are configured for full duplex, synchronized communication via a carrier-based modulation scheme over the bus links,
wherein to synchronize the nodes, the main node transmits a downstream synchronization header in a downstream direction at a start of a superframe; and
each sub node in the plurality of nodes transmits an upstream response header with a timing that is adjusted based on a delay in receiving the downstream synchronization header and a delay for the upstream response header to reach the main node by an end of the superframe.

34. The communication system of claim 33, wherein an order of the plurality of nodes is enumerated during a discovery procedure.

35. The communication system of claim 33, wherein a number of nodes in the communication system is limited based on time budget of a length of a superframe including a time for the downstream synchronization header, a time for the upstream response header, a cable delay, and a time for processing at each sub-node in each direction.

* * * * *